United States Patent
Davenport et al.

(10) Patent No.: US 6,341,626 B1
(45) Date of Patent: Jan. 29, 2002

(54) FLEXIBLE PROTECTIVE SLEEVE

(75) Inventors: Adrian Charles Davenport, Coventry; Richard Stuart Williams, Rugby, both of (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/673,604

(22) PCT Filed: Mar. 15, 1999

(86) PCT No.: PCT/GB99/00771

§ 371 Date: Nov. 30, 2000

§ 102(e) Date: Nov. 30, 2000

(87) PCT Pub. No.: WO99/54654

PCT Pub. Date: Oct. 28, 1999

(30) Foreign Application Priority Data

Apr. 18, 1998 (GB) .............................. 9808290

(51) Int. Cl.⁷ .................................. F16L 57/00
(52) U.S. Cl. ................... 138/110; 138/170; 138/178; 138/DIG. 1
(58) Field of Search ................ 138/170, 141, 138/178, DIG. 1, 110

(56) References Cited

U.S. PATENT DOCUMENTS

| | | | | |
|---|---|---|---|---|
| 4,016,356 A | * | 4/1977 | McLoughlin | 138/178 |
| 4,022,248 A | * | 5/1977 | Hepner et al. | 138/141 |
| 4,268,309 A | * | 5/1981 | Jervis | 138/178 |
| 4,722,471 A | * | 2/1988 | Gray et al. | 228/265 |
| 4,735,836 A | * | 4/1988 | Giebel et al. | 138/158 |
| 4,778,700 A | * | 10/1988 | Pereira | 138/DIG. 1 |
| 4,802,509 A | | 2/1989 | Brandolf | 138/110 |
| 5,024,249 A | * | 6/1991 | Botsolas | 138/178 |
| 5,411,777 A | * | 5/1995 | Steele et al. | 138/170 |
| 5,439,031 A | * | 8/1995 | Steele et al. | 138/178 |
| 5,727,599 A | | 3/1998 | Fisher et al. | 138/156 |
| 5,964,252 A | * | 10/1999 | Simmons et al. | 138/DIG. 1 |
| 6,053,212 A | * | 4/2000 | Thomas | 138/154 |

FOREIGN PATENT DOCUMENTS

| | | |
|---|---|---|
| FR | 2 709 340 | 3/1995 |
| WO | WO 97/34351 | 9/1997 |
| WO | WO 97/35134 | 9/1997 |

OTHER PUBLICATIONS

Patent Abstracts of Japan, vol. 018, No. 139 (E–1519), Mar. 8, 1994 & JP 05 326046 A (Yazaki Corp.), Dec. 10, 1993 (see abstract).

* cited by examiner

*Primary Examiner*—James Hook
(74) *Attorney, Agent, or Firm*—Synnestvedt & Lechner LLP

(57) ABSTRACT

A flexible protective sleeve for use in protecting an elongated member comprises a generally tubular wall for at least substantially surrounding the member. The sleeve also comprises permanent adhesive adhered to an interior surface of said wall. The adhesive is effective to stick the elongated member to the interior surface.

4 Claims, 1 Drawing Sheet

FLEXIBLE PROTECTIVE SLEEVE

This invention is concerned with a flexible protective sleeve for use in protecting an elongated member, such as a wire, a bundle of wires, or a pipe. Such sleeves, conventionally, comprise a generally tubular wall for at least substantially surrounding the member.

Conventionally, flexible protective sleeves are used for protecting wires or pipes from contact with other components to avoid undesirable noise generation and/or abrasion damage. Such sleeves may also act to insulate a member from heat and may have a metallic layer deposited thereon or adhered thereto in order to reflect away infra-red radiation. Such sleeves are used, for example, in the engine compartments of vehicles. Some flexible protective sleeves have a longitudinal slit in their wall to enable an elongated member to be positioned in the sleeve.

This invention is applicable, for example, to flexible protective sleeves of the convoluted type. Such a sleeve has its wall formed from sheet plastics material which is formed into convolutions to increase flexibility, ie the wall has a diameter which varies in a regular manner along the length of the sleeve so that the exterior surface has a series of annular crests separated by troughs. When the sleeve bends, the crests move further apart on the outside of the curve and closer together on the inside of the curve.

Although flexible protective sleeves of the convoluted type are effective in protecting elongated members contained therein from abrasion damage and, in many cases, reduce noise, the sleeves themselves can also be a source of noise, since they may vibrate against the elongated member causing an undesirable rattle. Various proposals have been made for reducing this rattling noise. For example, the problem of reducing noise from such sleeves has been considered in EP 0 556 140 B where the proposed solution is to cover the wall of the sleeve with a strip of sound-insulating material, eg felt, which is adhered to the wall of the sleeve. The strip covers the outer surface of the wall and passes through a slit to cover the inner surface of the wall. Thus, the strip can cushion impacts both between the exterior surface of the wall and adjacent components and also impacts between the interior surface of the wall and the elongated member. However, the use of such a strip has the disadvantages that: the process of applying the strip is complex; the strip may absorb liquids; the bulk of the sleeve is considerably increased; and the strip may become detached in service.

It is an object of the present invention to provide a flexible protective sleeve in which the problem of rattling mentioned-above is reduced or eliminated without incurring the above-mentioned disadvantages.

The invention provides a flexible protective sleeve for use in protecting an elongated member, the sleeve comprising a generally tubular wall for at least substantially surrounding the member, characterized in that the sleeve also comprises permanent adhesive adhered to an interior surface of said wall, said adhesive being effective to stick the elongated member to said interior surface of the wall.

The term "permanent adhesive" is used herein to denote an adhesive which remains sticky or "tacky" for long periods so that it can hold an elongated member on contact and, if said member becomes detached, the adhesive can re-establish adhesion on further contact. Such adhesives are well-known and find applications, eg in holding posters on walls, in self-adhesive tapes, etc. One suitable permanent adhesive is a surfactant stabilized acrylic ester copolymer dispersed in water marketed by Harlow Chemical Company under the designation "Revacryl 398". This dispersion can be sprayed on to a surface and dries to form a film of high cohesive strength with moderate tack and adhesion to the surface.

In a protective sleeve according to the invention, when the elongated member contacts the interior surface of the wall of the sleeve, said adhesive sticks the member to the sleeve preventing relative movement therebetween and hence preventing rattling. Should the adhesion be broken at any point, it can be re-established at the same or a different point upon further contact.

The invention is applicable to protective sleeves in which the wall is formed from sheet plastics material and is convoluted but is also applicable to sleeves formed in other ways, eg by braiding or weaving monofilaments or yarns.

It is not necessary for the permanent adhesive to entirely cover the interior surface of the wall of the sleeve. Indeed, in the case of a convoluted sleeve, only adhesive on the crests of the interior surface will be effective. For example, the adhesive can cover discrete areas of said interior surface, eg as bands of adhesive following a helical path along the sleeve, or as "islands" of adhesive distributed in a pattern, or only on the crests.

Where a sleeve according to the invention has a longitudinal slit to allow insertion of the elongated member, the adhesive can be applied as a spray, preferably water-based, from a nozzle inserted through the slit while the sleeve is moved past the nozzle. It is possible also to provide that the slit has overlapping edge regions to one of which the adhesive is applied so that the adhesive can be used to seal the slit.

There now follows a detailed description to be read with reference to the accompanying drawings of a protective sleeve which is illustrative of the invention.

Figure 1:
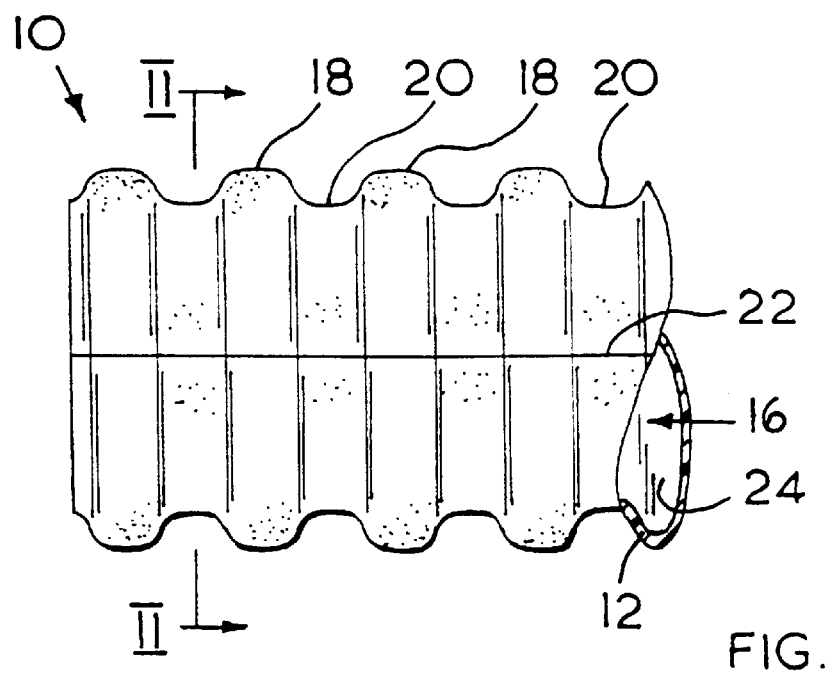
FIG. 1 is a side elevational view of the illustrative sleeve.

The illustrative sleeve 10 is flexible and is for use in protecting an elongated member such as a bundle of wires (not shown). The illustrative sleeve 10 has a wall 12 which is generally tubular and encloses a space 16 in which an elongated member can be contained. The wall 12 is formed from sheet plastics material, specifically nylon, which is formed into convolutions. The wall 12 is, preferably, formed by extruding a tube and expanding the tube into a convoluting die. The convolutions have annular crests 18 separated by annular troughs 20. The wall 12 has a longitudinally-extending slit 22 therethrough which enables a member to be inserted into the space 16. The wall 12 has an interior surface 24 which substantially surrounds a member placed in the space 16.

Figure 2:
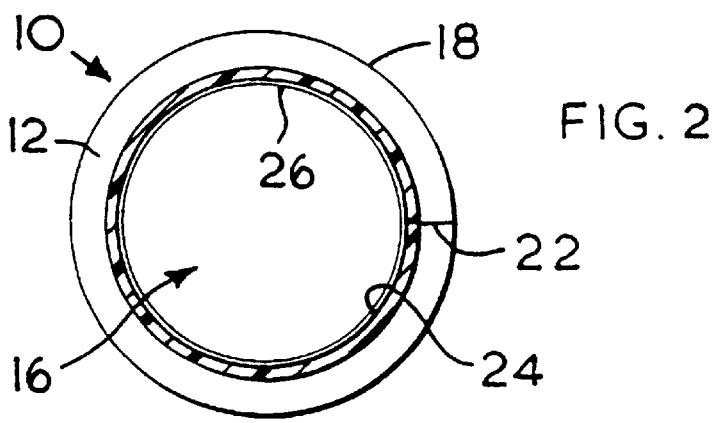
FIG. 2 is a cross-sectional view taken on the line II—II in FIG. 1.

The sleeve 10 also comprises a layer of permanent adhesive 26 (omitted from FIG. 1 but shown in FIG. 2). The adhesive 26 adheres to and covers the interior surface 24 of the wall 12. Said adhesive 26 is effective to stick an elongated member which is in the space 16 to said interior surface 24.

Figure 3:
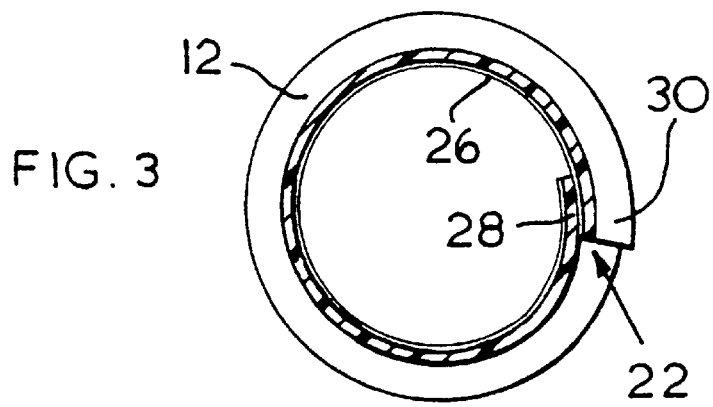
FIG. 3 is a view similar to FIG. 2 but of a modification of the illustrative sleeve.

In the modification of the sleeve 10 which is shown in FIG. 3, the slit 22 has overlapping edge regions 28 and 30 of the wall 12. The outer edge region 30 has the adhesive 26 applied thereto on its interior surface so that the adhesive 26 can be used to seal the slit 22 after the member has been inserted into the space 16. In the case of the modification shown in FIG. 3, the portions of the convolutions on the edge regions 28 and 30 are formed in such a way that the edge region 28 can nest into the edge region 30. Specifically, the convolution portions of the edge region 28 have narrower crests 18 to fit within the crests of the edge region 30.

What is claimed is:

1. A flexible protective sleeve for use in protecting an elongated member, the sleeve comprising a generally tubular wall for at least substantially surrounding the member, wherein the sleeve also comprises permanent adhesive adhered to an interior surface of said wall, said adhesive being effective to stick the elongated member to said interior surface of the wall.

2. A sleeve according to claim 1, wherein the wall is formed from sheet plastics material and is convoluted.

3. A sleeve according to claim 1, wherein the adhesive covers discrete areas of said interior surface.

4. A sleeve according to claim 1, wherein the sleeve has a longitudinally-extending slit through its wall, the slit having overlapping edge regions to one of which the adhesive is applied so that the adhesive can be used to seal the slit.

* * * * *